US011920323B2

(12) United States Patent
Matousek et al.

(10) Patent No.: US 11,920,323 B2
(45) Date of Patent: Mar. 5, 2024

(54) COUNTERWEIGHT ASSEMBLY FOR WORK MACHINES

(71) Applicant: Caterpillar Inc., Peoria, IL (US)

(72) Inventors: Dennis Allen Matousek, West Chicago, IL (US); Brian Cole Howson, Bolingbrook, IL (US); Scott Andrew McGregor, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 308 days.

(21) Appl. No.: 17/453,493

(22) Filed: Nov. 4, 2021

(65) Prior Publication Data

US 2023/0134847 A1 May 4, 2023

(51) Int. Cl.
*E02F 9/18* (2006.01)
*B62D 49/08* (2006.01)
*E02F 3/76* (2006.01)

(52) U.S. Cl.
CPC .............. *E02F 9/18* (2013.01); *B62D 49/085* (2013.01); *E02F 3/769* (2013.01)

(58) Field of Classification Search
CPC ........... E02F 9/18; E02F 3/769; B62D 49/085
See application file for complete search history.

(56) References Cited

U.S. PATENT DOCUMENTS

| 4,068,876 A | 1/1978 | Muellner |
| 5,462,309 A * | 10/1995 | Jeffers ..................... E02F 9/18 |
| | | 187/222 |
| 10,562,476 B2 * | 2/2020 | McGregor ............ B60R 19/023 |
| 2012/0153605 A1 * | 6/2012 | Hetzel ................ B62D 49/0628 |
| | | 280/755 |
| 2016/0312436 A1 | 10/2016 | Nowak et al. |

FOREIGN PATENT DOCUMENTS

| CN | 207017336 U | 2/2018 | |
| CN | 21117216 U | 8/2020 | |
| CN | 113638462 A * | 11/2021 | ................ E02F 9/18 |
| DE | 202011000694 U1 * | 9/2011 | .......... B62D 49/085 |
| DE | 102012011265 A1 * | 12/2013 | .......... B62D 49/085 |
| GB | 2401591 | 5/2005 | |
| KR | 100611716 B1 * | 8/2006 | ................ E02F 9/18 |
| KR | 100656040 B1 | 12/2006 | |

* cited by examiner

*Primary Examiner* — Faye M Fleming

(57) ABSTRACT

A counterweight assembly for a work machine includes a structure, support studs, a first side wall, and a second side wall. The structure is coupled to a frame of the work machine and defines through holes, a first side end, and a second side end. The support studs are coupled to the frame and correspondingly received into the through holes to support the structure against the frame. The first side wall extends from the first side end and defines a first eyelet. The second side wall extends from the second side end and defines a second eyelet. A work machine guard rail is received between the first side wall and second side wall. One or more of the first eyelet and the second eyelet receive a lifting assembly for lifting the work machine, and the support studs transfer a lifting force from the counterweight assembly to the frame.

20 Claims, 8 Drawing Sheets

COUNTERWEIGHT ASSEMBLY FOR WORK MACHINES

TECHNICAL FIELD

The present disclosure relates to a counterweight assembly for a work machine.

BACKGROUND

Work machines, such as wheel loaders, and the like, are commonly applied for earth moving operations at various worksites. As part of earth moving operations, such machines often use a work implement, e.g., a bucket, to receive a load. Once the load is received, the machine is moved or maneuvered to a desired location so as to transfer and release the load at the desired location. To accomplish such operations, it is often required that the load imposed on the machine be appropriately counterbalanced. Further, it is also desired that the machine be protected from interference with external elements of the worksite, during machine movements. Moreover, lighting fixtures are to be provided to either or both illuminate a travel path of the machine and/or indicate an operational stage associated with the machine. In addition, such machines may also need to be raised or lowered into certain locations for applications, e.g., for being stowed away when not in use, when being hoisted to be placed in a worksite with limited access, when being shipped to a new location, and/or when being used to move earth from those locations.

U.S. Pat. No. 4,068,876 relates to a construction vehicle that has a rear bumper assembly mounted on a frame. The bumper assembly comprises a horizontally disposed bottom plate and a plurality of upstanding plates which define a closed compartment having a counterweight therein. The counterweight is attached to the bottom plate by a spacer which extends through the center of gravity of the counterweight and by a pair of bolts attached to opposite ends of the spacer.

SUMMARY OF THE INVENTION

In one aspect, the disclosure relates to a counterweight assembly for a work machine. The counterweight assembly includes a structure, one or more support studs, a first side wall, and a second side wall. The structure is configured to be coupled to a frame of the work machine. The structure defines one or more through holes, a first side end, and a second side end opposing the first side end. The support studs are configured to be fixedly coupled to the frame and be correspondingly received into the through holes to align and support the structure against the frame. The first side wall extends from the first side end and defines a first eyelet. The second side wall extends from the second side end and defines a second eyelet. The second side wall is spaced apart from the first side wall to receive a guard rail of the work machine therebetween. One or more of the first eyelet and the second eyelet are configured to receive a lifting assembly for a lifting of the work machine, and the support studs are configured to transfer a lifting force during the lifting of the work machine from the counterweight assembly to the frame.

In another aspect, the disclosure is directed to a work machine. The work machine includes a frame, and a counterweight assembly. The counterweight assembly includes a structure, one or more support studs, a first side wall, and a second side wall. The structure is coupled to the frame and defines one or more through holes, a first side end, and a second side end opposing the first side end. The support studs are fixedly coupled to the frame and correspondingly received into the through holes to align and support the structure against the frame. The first side wall extends from the first side end and defines a first eyelet. The second side wall extends from the second side end and defines a second eyelet. Further, the second side wall is spaced apart from the first side wall to receive a guard rail of the work machine therebetween. One or more of the first eyelet and the second eyelet are configured to receive a lifting assembly for a lifting of the work machine. Also, the support studs are configured to transfer a lifting force during the lifting of the work machine from the counterweight assembly to the frame.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
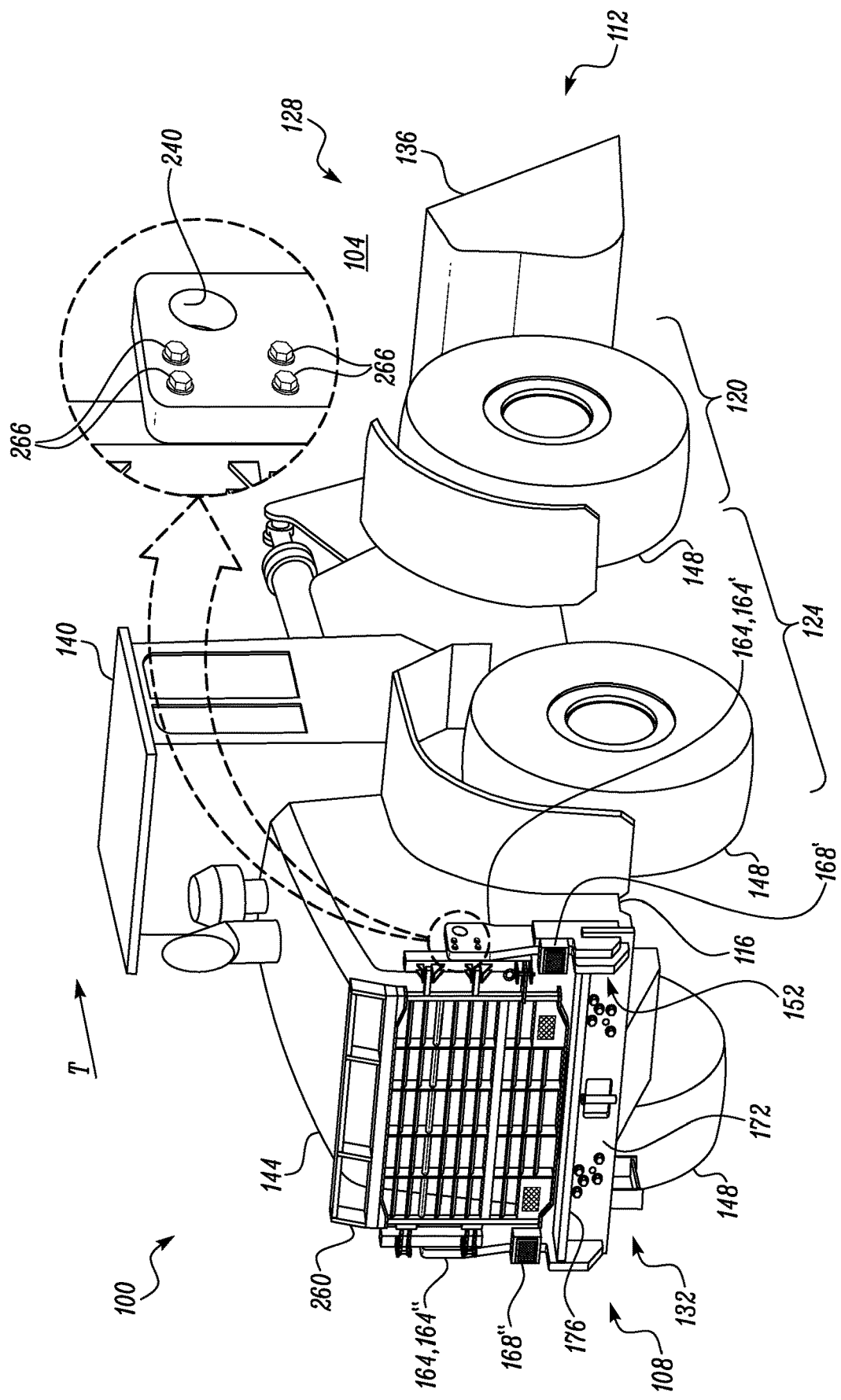
FIG. 1 is a rear perspective view of an exemplary work machine that includes a counterweight assembly, in accordance with one or more aspects of the present disclosure.

Referring to FIG. 1, a work machine 100 is shown. The work machine 100 may be a ground-borne mobile machine configured to travel across an expanse of a worksite 104 and perform earth altering or earth moving operations at the worksite 104. The work machine 100 may include a wheel loader 108, such as a medium wheel loader 112, as shown. However, aspects of the present disclosure may be applied to a variety of other work machines, such as agricultural machines or constructions machines, for example, a dozer, a skid-steer loader, an excavator, a grader, and/or to any other machine known to or contemplatable by a person skilled in the art. The work machine 100 may be an autonomously or semi-autonomously operated machine.

The work machine 100 may include a chassis or a frame 116 to support various machines parts, panels, and subsystems, thereon. The frame 116 may include a split-frame configuration, defining a forward frame portion 120 and a rearward frame portion 124. The rearward frame portion 124 may include a section to which a bumper (not shown) of the work machine 100 may be coupled to. Both the forward frame portion 120 and the rearward frame portion 124 may be pivotably coupled to each other at a pivot point (not shown). Said forward frame portion 120 may define a forward end 128 of the work machine 100 and said rearward frame portion 124 may define a rearward end 132 of the work machine 100. Terms such as 'forward', 'front', 'rear', 'rearward', and the like, as used in the present disclosure, may be understood according to an exemplary direction, T, in which the work machine 100 may move during operations, with said exemplary direction, T, being defined from the rearward end 132 towards the forward end 128.

The work machine 100 may include an implement 136, such as a bucket. The implement 136 may be coupled to the frame 116 (e.g., to the forward frame portion 120 of the frame 116), possibly via intermediate structures such as linkage elements (not shown), and may be disposed at the forward end 128 of the work machine 100. The implement 136 (or the bucket) may be used to alter the earth at the worksite 104. For example, the implement 136 (or the bucket) may scoop in and receive materials (e.g., a portion of earth that may include debris, soil, rocks, stones, disintegrated particles, etc.) during an earth moving operation, and the work machine 100 may then be powered to travel to a location of the worksite 104 so as to release and dump said materials at said location. In that manner, the work machine 100 may be applicable for moving earth at the worksite 104.

The work machine 100 may also include an operator cabin 140 and a power compartment 144. Both the operator cabin 140 and the power compartment 144 may be supported on the rearward frame portion 124 of the frame 116, with the operator cabin 140 taking a position between the forward frame portion 120 and the power compartment 144. The operator cabin 140 may include various input devices and controls. An access to such input devices and controls may enable an operator to control various aspects of the work machine 100, e.g., manipulate or actuate the implement 136, move the work machine 100, and the like.

The power compartment 144 may house a power source, e.g., an internal combustion engine (not shown), that may power a myriad of functions of the work machine 100. For example, the power source may power one or more traction devices 148 (e.g., wheels and/or endless crawler tracks) of the work machine 100, enabling the work machine 100 to move and travel across an expanse of the worksite 104, i.e., from one location to another location of the worksite 104. The power source may also power an actuation of the implement 136 and various other functions of the work machine 100. According to some embodiments, it is possible for the work machine 100 to include other types of power sources, e.g., an electrical power source, that may be applied alone or in combination with an internal combustion engine.

Referring to FIGS. 1 to 4, the work machine 100 may include a counterweight assembly 152. The counterweight assembly 152 may be applied to counterbalance a load imposed on the work machine 100, e.g., a load of the materials that is received by the implement 136. Given that the implement 136 is disposed at the forward end 128 of the work machine 100, the counterweight assembly 152 may be provided at the rearward end 132 of the work machine 100. In so doing, any load imposed at the forward end 128 (e.g., by a receipt of the materials into the implement 136 at the forward end 128) may be balanced out and counteracted by the counterweight assembly 152 disposed at the rearward end 132 of the work machine 100. In that manner, the counterweight assembly 152 may stabilize the work machine 100 during earth moving operations. As an example, the counterweight assembly 152 may be coupled to the frame 116 at the rearward frame portion 124 of the frame 116 and may be disposed rearwardly of the work machine 100. Apart from counterbalancing loads received by the implement 136, the counterweight assembly 152 may serve additional purposes, details related to each of which will be understood through the discussions in the forthcoming description.

Referring to FIGS. 2 to 5, the counterweight assembly 152 is discussed in further detail. The counterweight assembly 152 includes a structure 156 and one or more support studs 160 (e.g., a first support stud 160' and a second support stud 160"). The counterweight assembly 152 also includes side walls 164, e.g., a first side wall 164' and a second side wall 164". Further, the counterweight assembly 152 also includes a first housing 168' and a second housing 168".

The structure 156 may be coupled to the frame 116 (e.g., to the rearward frame portion 124 of the frame 116). The structure 156 may include a first plate 172 and a second plate 176. Both the first plate 172 and the second plate 176 may define planarly extending profiles. Although not limited, the first plate 172 and the second plate 176 may be similar in their lengths (e.g., see length, L, FIG. 3). In some cases, the first plate 172 and the second plate 176 may be similarly sized and/or shaped. Although not limited, the second plate 176 may be disposed orthogonally with respect to the first plate 172. In some embodiments, both the first plate 172 and the second plate 176 may be formed from sheet metal. The structure 156 or an assembly of the first plate 172 and the second plate 176 may define a first side end 180 of the structure 156 and a second side end 184 of the structure 156. The second side end 184 may be opposed to the first side end 180, as shown.

Figure 5:
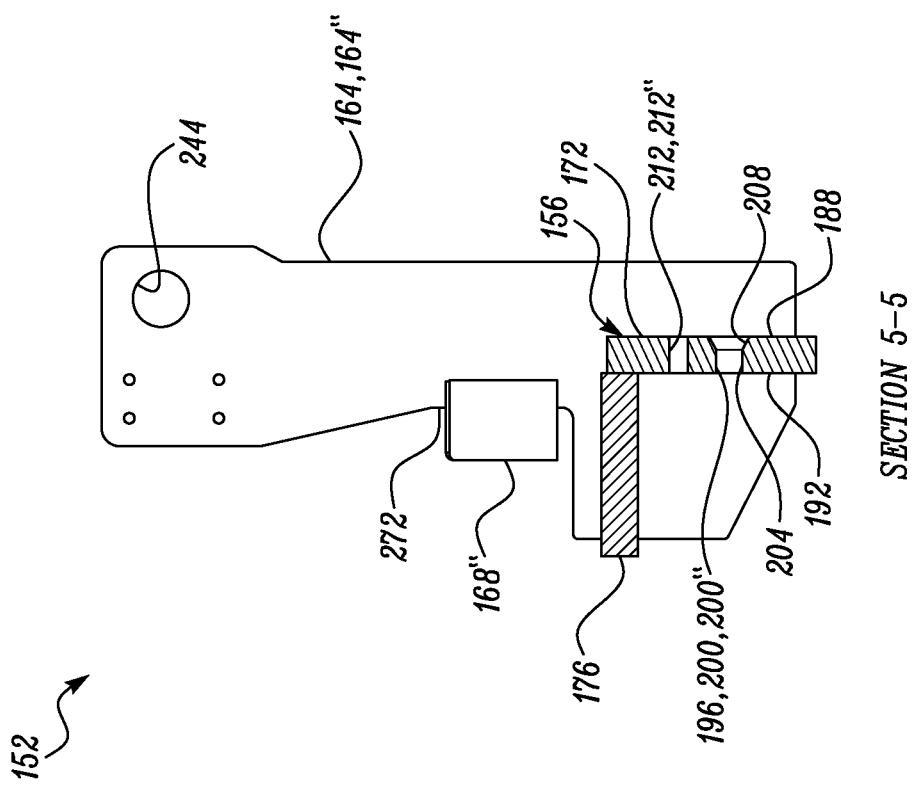
FIG. 5 is a cross-sectional view of the counterweight assembly illustrating sections and profiles of a first plate and a second plate of a structure of the counterweight assembly, in accordance with one or more aspects of the present disclosure.

Further, the first plate 172 may define surfaces (or flat surfaces)—for example, the first plate 172 may define a first surface 188 and a second surface 192 (see FIG. 5). The second surface 192 may be in opposing relationship to the first surface 188. The structure 156 may also define one or more through holes 196 (or first through holes 200). Said first through holes 200 may be formed in the first plate 172. As an example, two first through holes 200—i.e., a primary first through hole 200' and a secondary first through hole 200" may be provided in the first plate 172. Additional or lesser number of first through holes 200 may be contemplated. The first through holes 200 may extend from the first surface 188 to the second surface 192, defining corresponding openings at each of the first surface 188 and the second surface 192. Each of the first through holes 200 may further define an inner surface 204 and a chamfered surface or a chamfered edge 208 extending and diverging from (or from near) the inner surface 204 to the first surface 188 (see profile of the secondary first through hole 200" in FIG. 5 for reference). In an assembly of the counterweight assembly 152 to the frame 116, the first surface 188 may be directed towards the frame 116 (or towards the rearward frame portion 124 of the frame 116).

Figure 3:
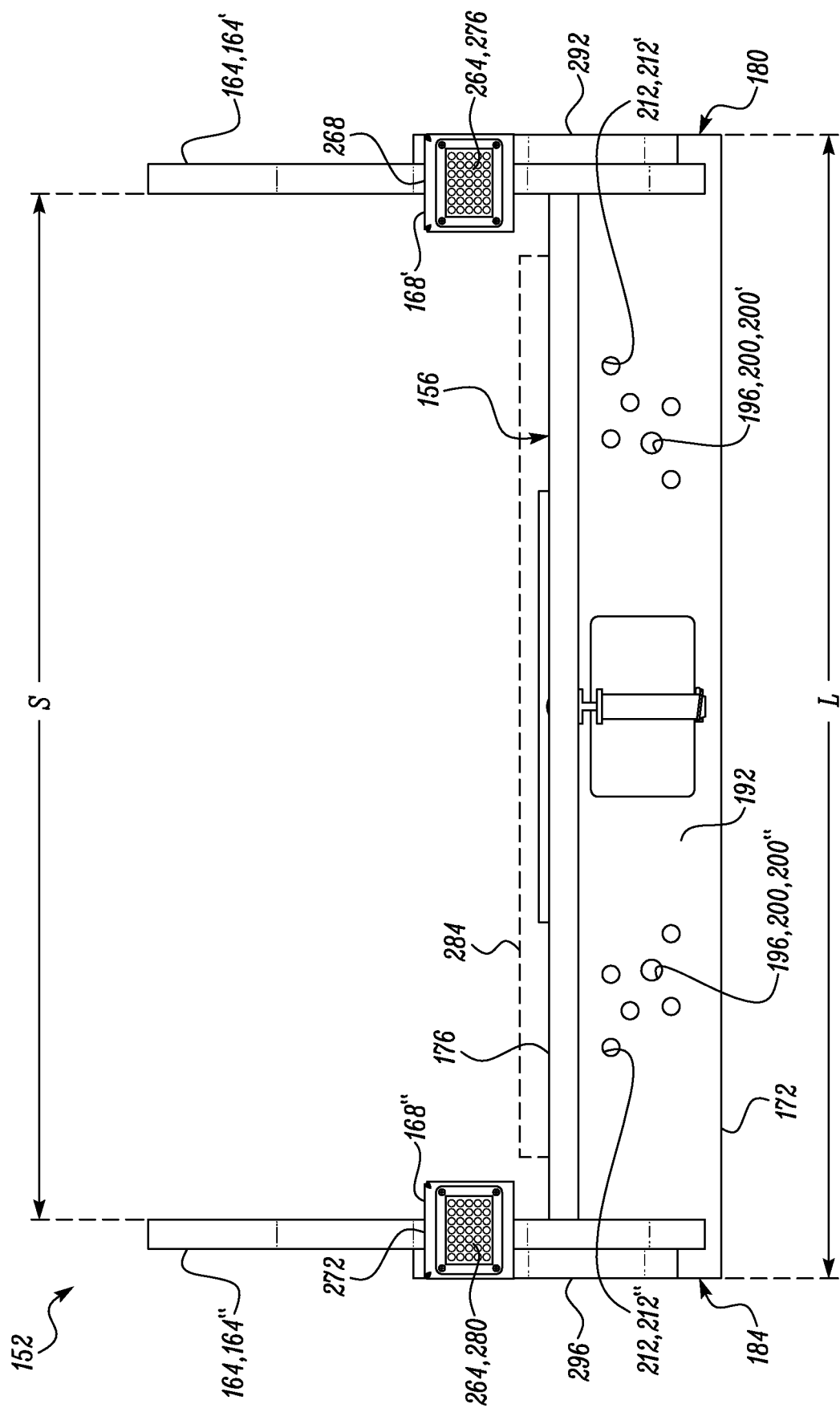
FIG. 3 is a rear view of the counterweight assembly, in accordance with one or more aspects of the present disclosure.
Figure 4:
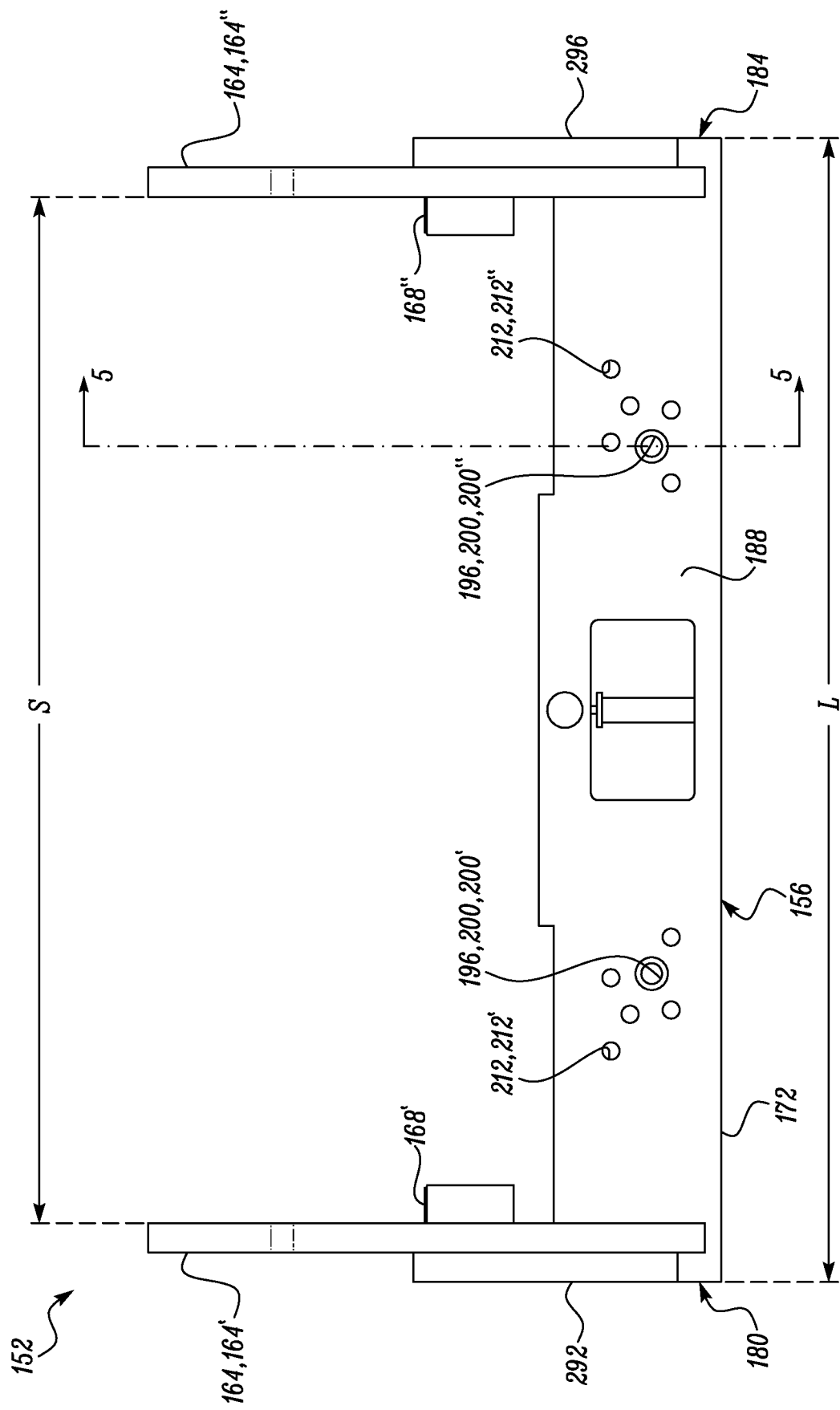
FIG. 4 is a front view of the counterweight assembly, in accordance with one or more aspects of the present disclosure.

The structure 156 may further define second through holes 212 (see FIGS. 3 and 4). The second through holes 212 may be formed in the first plate 172 as well. In FIGS. 3 and 4, it may be noted that exemplarily five second through holes 212 are clustered around or arranged adjacent to the primary first through hole 200', but only one of said five second through holes 212 is marked for clarity. Similarly, and exemplarily, five second through holes 212 are clustered around or arranged adjacent to the secondary first through hole 200", but only one of said five second through holes 212 is marked for clarity. Additional or lesser number of the second through holes 212 are possible. The second through holes 212 that are clustered around or arranged adjacent to the primary first through hole 200' may be referred to as the primary set of second through holes 212'. Further, the second through holes 212 that are clustered around or arranged adjacent to the secondary first through hole 200" may be referred to as the secondary set of second through holes 212".

A layout of the second through holes 212, as illustrated in FIGS. 3 and 4, is however exemplary, and those skilled in the art may contemplate variations in said layout and arrangement, e.g., based on spatial constraints, type of work machine, etc. Like the first through holes 200, the second through holes 212 may also extend from the first surface 188 to the second surface 192, defining corresponding openings at each of the first surface 188 and the second surface 192 (see FIG. 5). However, the second through holes 212 may be devoid of a chamfered surface or a chamfered edge as may be provided for each of the first through holes 200. The second through holes 212 may correspondingly receive one or more fasteners 216 (for clarity, only some of which have been marked, see FIG. 2) therethrough to couple and secure the structure 156 to the frame 116 (or to the rearward frame portion 124 of the frame 116). Fasteners 216 can include a threaded portion and a head portion, and the second through holes 212 may be correspondingly threaded.

Figure 2:
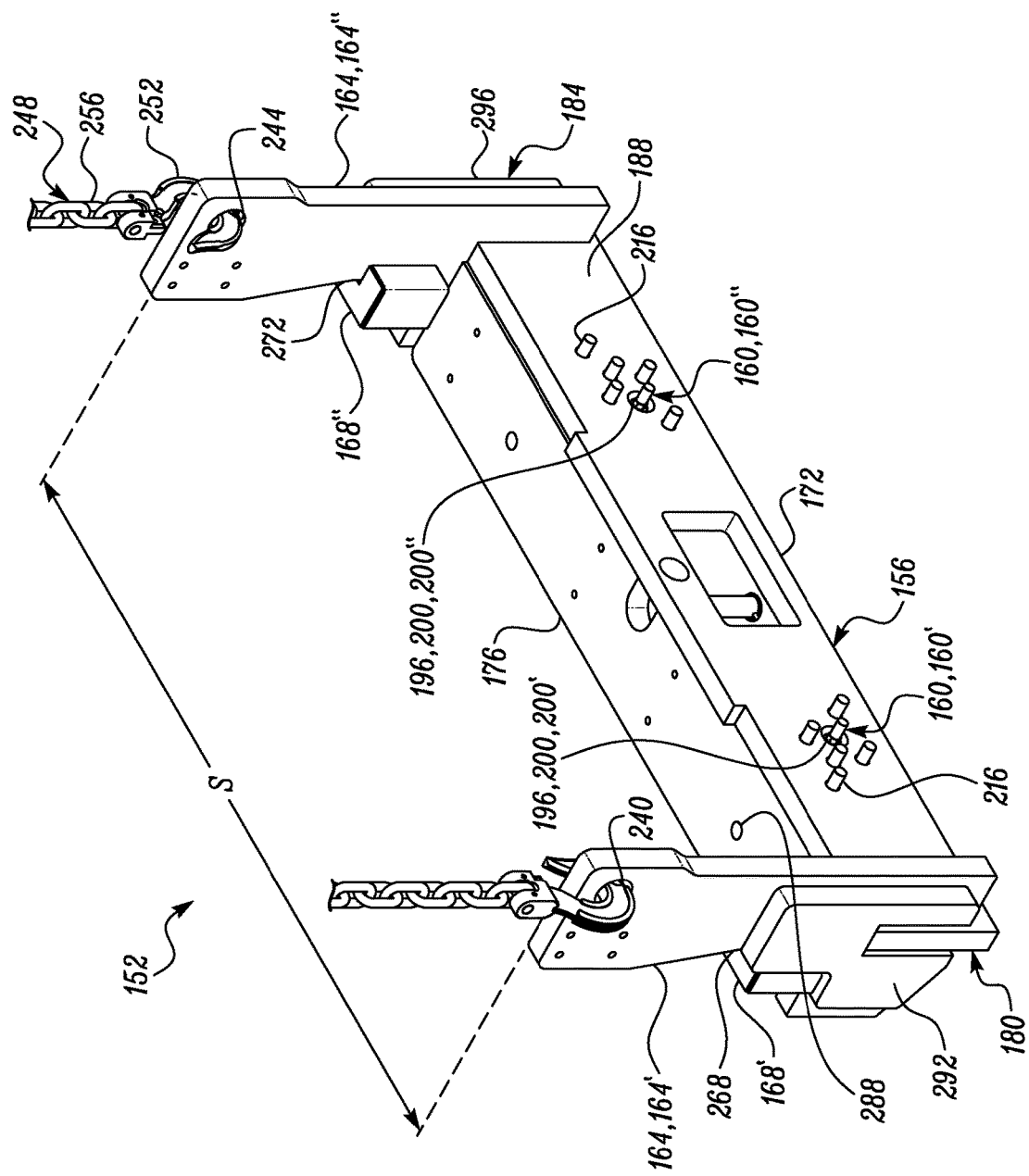
FIG. 2 is a front perspective view of the counterweight assembly, in accordance with one or more aspects of the present disclosure.
Figure 6:
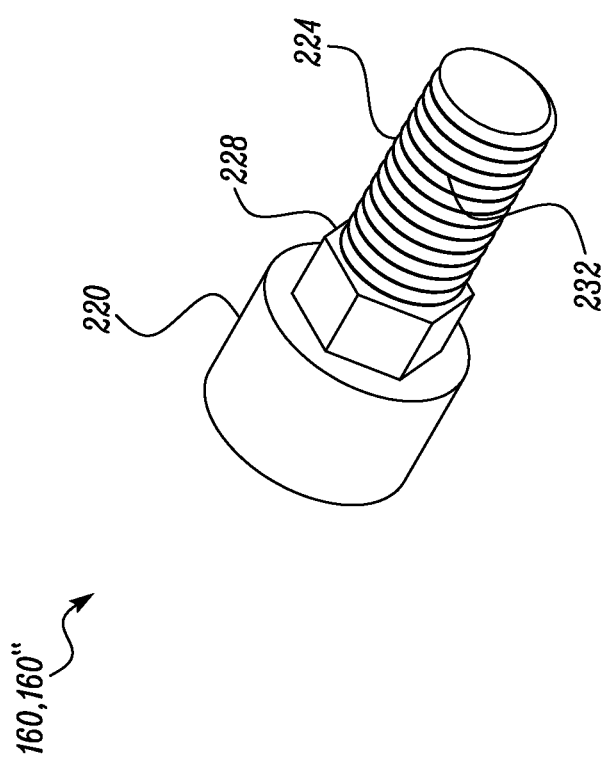
FIG. 6 is a perspective view of a support stud applied to align and support the counterweight assembly against a frame of the work machine, in accordance with one or more aspects of the present disclosure.

Referring to FIGS. 2 and 6, the support studs 160 (i.e., the first support stud 160' and the second support stud 160") may be fixedly coupled (e.g., by welding and/or threading) to the frame 116 (e.g., to the rearward frame portion 124 of the frame 116) so as to be irremovable from the frame 116 (e.g., irremovable from the rearward frame portion 124 of the frame 116). The support studs 160 (i.e., the first support stud 160' and the second support stud 160") may also be correspondingly received into the primary first through hole 200' and the secondary first through hole 200" to align and support the structure 156 against the frame 116.

Referring to FIG. 6, the support studs 160 are discussed by reference to the second support stud 160". Said discussion may be applied to the first support stud 160', as well. The second support stud 160" may include an elongated, linearly extending structure made from high-strength steel or any inherently high-strength material or an alloy. The second support stud 160" may define a head portion 220, a shank portion 224, and a grasping portion 228. The grasping portion 228 may be arranged between the head portion 220 and the shank portion 224. The shank portion 224 may include threads 232. Further, the grasping portion 228 may be engaged by a tool (e.g., a wrench or a spanner) (not shown) so as to have the tool engage the second support stud 160" and tighten and threadably couple the shank portion 224, and thus the second support stud 160", into a corresponding threaded hole 236 (see FIGS. 7 and 8) defined by the frame 116 (or the rearward frame portion 124 of the frame 116). In a coupled state of the second support stud 160" with the frame 116 (or the rearward frame portion 124 of the frame 116), the head portion 220 of the second support stud 160" (and, in some cases, the grasping portion 228) may project or extend outwards of the frame 116 (or the rearward frame portion 124 of the frame 116) and onto which the secondary first through hole 200" may be mounted, so as to have the second support stud 160" received into the secondary first through hole 200" of the structure 156.

Referring again to FIGS. 2 to 5, the first side wall 164' and the second side wall 164" is discussed. The first side wall 164' and the second side wall 164" may include planarly and linearly extending profiles. As with the first plate 172 and the second plate 176, the first side wall 164' and the second side wall 164" may be shaped in the form of plates, as well. The first side wall 164' may extend from the first side end 180 of the structure 156 and may define a first eyelet 240. The second side wall 164" may extend from the second side end 184 of the structure 156 and may define a second eyelet 244. Although not limited, the first eyelet 240 and the second eyelet 244 may be defined away from or remote to the structure 156 and/or may be defined at an elevation (e.g., same elevation) with respect to the second plate 176, a shown. Also, the first eyelet 240 and the second eyelet 244 may be configured to receive a lifting assembly 248 (e.g., see arrangement of a hook 252 and a chain 256, FIG. 2) for a lifting of the work machine 100 off a ground surface. During such lifting of the work machine 100, the first support stud 160' and the second support stud 160" are configured to transfer a load or lifting force from the counterweight assembly 152 to the frame 116 (or to the rearward frame portion 124 of the frame 116).

The fixed coupling of the support studs 160 to the frame 116 (or to the rearward frame portion 124 of the frame 116) aids in said transfer of the load or lifting force through the support studs 160. In some embodiments, the head portion 220 may serve as the portion of the second support stud 160" that transfers the load or the lifting force (e.g., radially) from the counterweight assembly 152 to the second support stud 160", so that either or each of the weld or the thread, by which the second support stud 160" may be coupled to the frame 116 (or to the rearward frame portion 124 of the frame 116), may transfer the lifting force or the load from the counterweight assembly 152 to the frame 116 (or to the rearward frame portion 124 of the frame 116).

Further, the second side wall 164" may be spaced apart from the first side wall 164' such that a space, S, may be defined between the first side wall 164' and the second side wall 164". A guard assembly or a guard rail 260 (see FIG. 1) of the work machine 100, that may prevent interference of external elements with the rearward end 132, may be received in between (e.g., into the space, S, defined in between) the first side wall 164' and the second side wall 164". In some embodiments, the guard rail 260 may be fastened to the first side wall 164' by using fasteners 266 (see FIG. 1). As an example, four fasteners 266 are shown. Additional or lesser fasteners 266 may be contemplated. Further, similar fasteners (not shown) may be used to couple the guard rail 260 with the second side wall 164", as well. Moreover, one or more of the first side wall 164' and the second side wall 164" may extend upright or orthogonally relative to the structure 156 or relative to one or more of the first plate 172 and the second plate 176.

The first housing 168' and the second housing 168" may receive light units 264 of the work machine 100. As an example, the first housing 168' and the second housing 168" may be respectively coupled to a first portion 268 and a second portion 272 of the counterweight assembly 152 (see FIGS. 2, 7, and 8). The first portion 268 and the second portion 272 may correspond to portions respectively defined on the first side wall 164' and the second side wall 164", as shown. However, in some embodiments, it is possible for the first portion 268 and the second portion 272 to be defined elsewhere, e.g., on the second plate 176. Additionally, or optionally, other components or sensing systems, such as a (Light Detection and Ranging) LIDAR/(Radio Detection and Ranging) RADAR systems (not shown), applicable and/or usable during machine movements, etc., may be coupled to the first portion 268 and the second portion 272 of the counterweight assembly 152.

The first housing 168' and the second housing 168" may each include a box-shaped receptacle, although variations to its shape may be contemplated. Said box-shaped receptacles (i.e., the first housing 168' and the second housing 168") may respectively receive the light units 264, i.e., a first light unit 276 and a second light unit 280 of the work machine 100. The first light unit 276 and the second light unit 280 may illuminate a travel path of the work machine 100, indicate an operational stage associated with the work machine 100, and/or may also be indicative of where the work machine 100 is heading during its travel over and across the worksite 104.

In some embodiments, the counterweight assembly 152 may include one or more additional plates (e.g., additional plate 284, FIG. 3) that may be couplable to the structure 156 or to the second plate 176 to increase an overall weight of the counterweight assembly 152. In this regard, it is possible that the second plate 176 may include one or more holes (see example hole 288, FIG. 2) and the additional plates may include similar one or more holes (not shown). During an installation and assembly of the counterweight assembly 152 with the frame 116 (or with the rearward frame portion 124 of the frame 116), holes of the second plate 176 may be aligned with the holes of the additional plates and fasteners (not shown) may be driven and/or passed through such holes so as to couple said additional plates with the second plate 176.

In some embodiments, the counterweight assembly 152 may be formed by welding all of its parts together. For example, the first plate 172, the second plate 176, the first side wall 164', the second side wall 164", the first housing 168', the second housing 168" may be brought together (e.g., one by one) such that all said parts may be located with respect to the other and then suitably welded to arrive at the counterweight assembly 152, as exemplarily discussed above and illustrated in FIGS. 1 to 6. Forming of the through holes, e.g., the first through holes 200, the second through holes 212, the first eyelet 240, and the second eyelet 244, may be attained by machining processes, such as boring. In some embodiments, the counterweight assembly 152 may also include further supplementary plates, e.g., a first side plate 292 and a second side plate 296, that may add to the strength, rigidity, and/or to the overall weight of the counterweight assembly 152.

INDUSTRIAL APPLICABILITY

Figure 7:
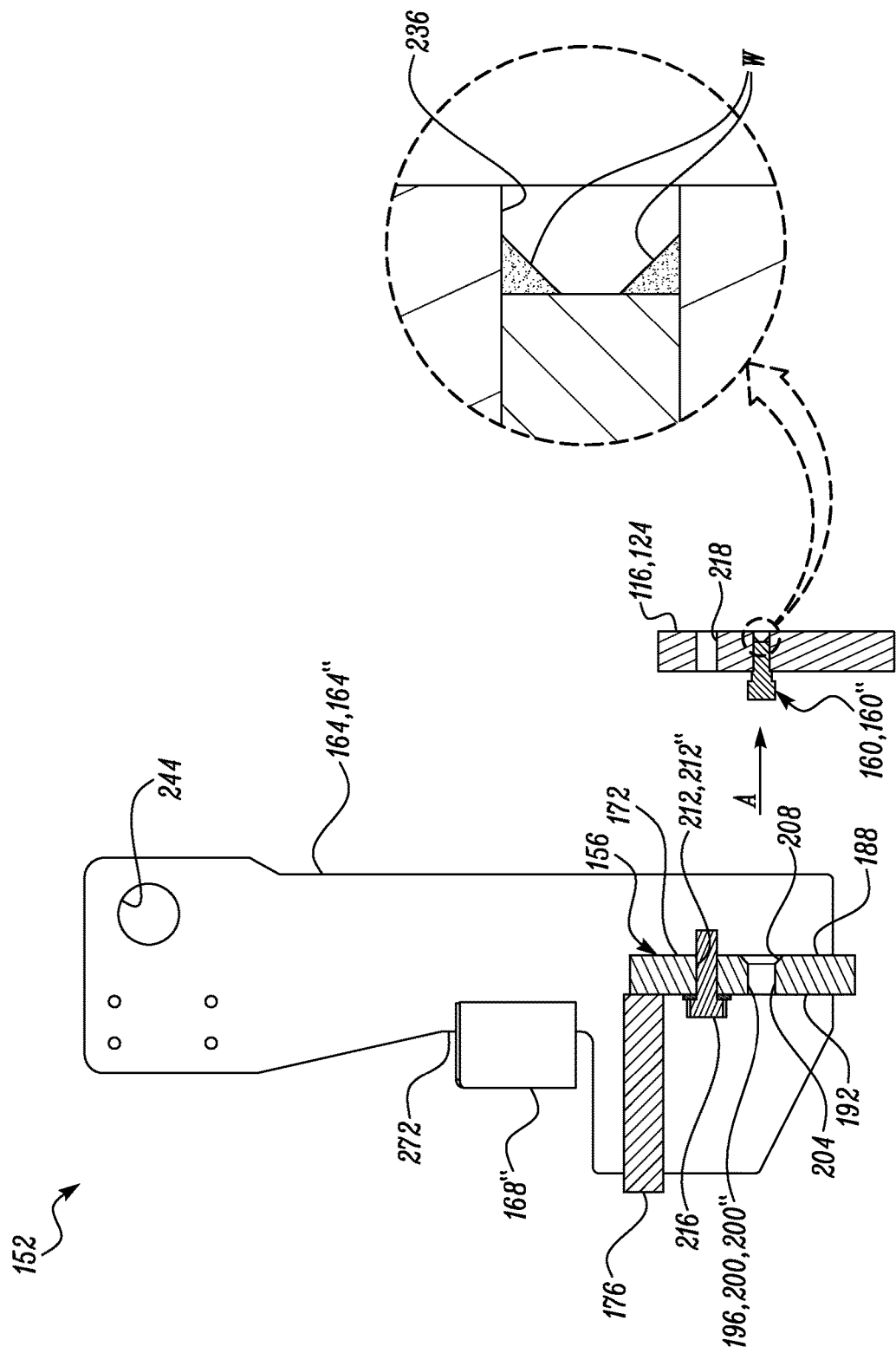
FIGS. 7 and 8 illustrate a process to mount the counterweight assembly to the frame of the machine, in accordance with one or more aspects of the present disclosure.
Figure 8:
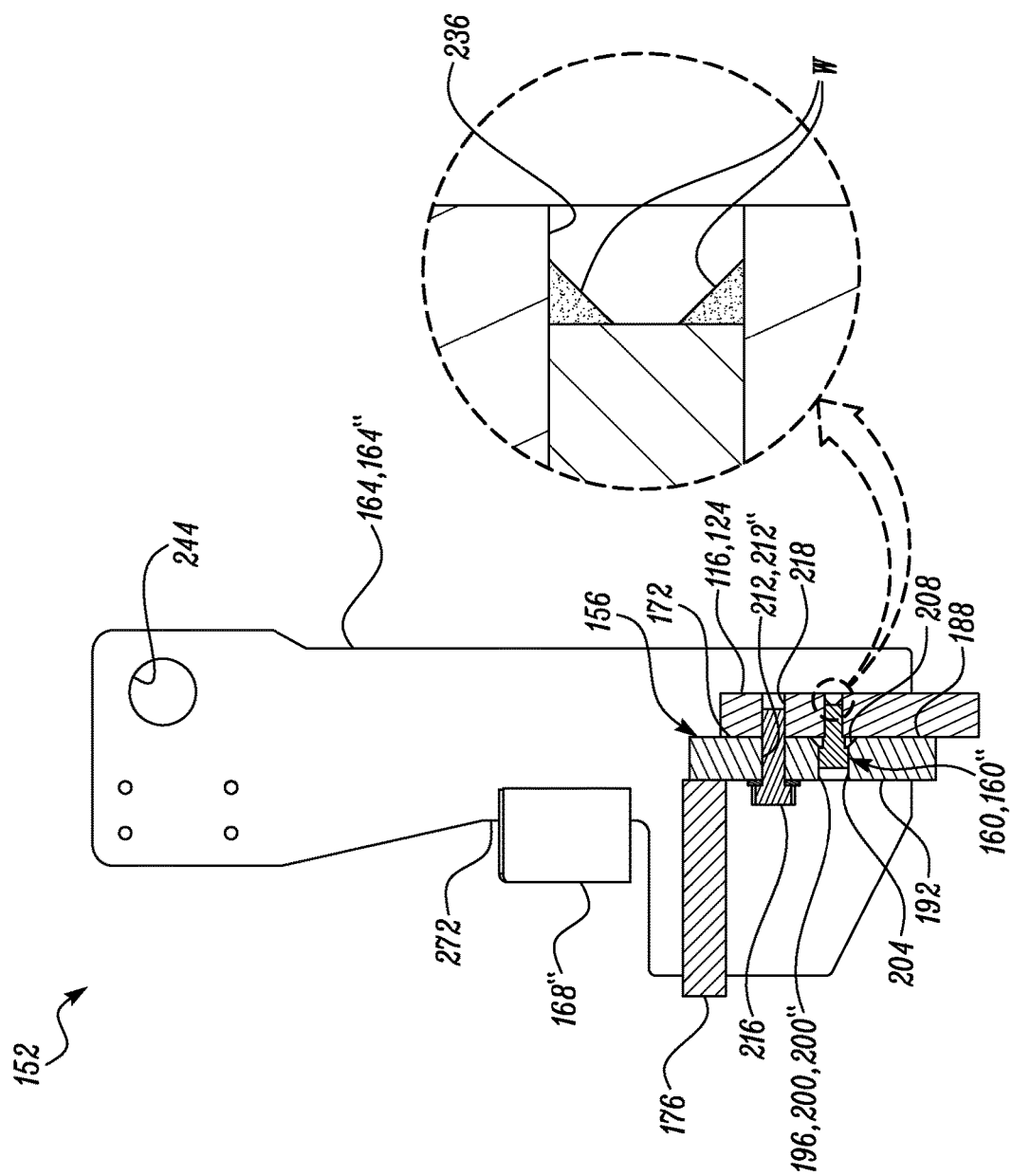

Referring to FIGS. 7 and 8, an exemplary manner of assembling the counterweight assembly 152 to the frame 116 (or to the rearward frame portion 124 of the frame 116) is discussed. During an assembly of the counterweight assembly 152 to the frame 116 (or to the rearward frame portion 124 of the frame 116), an operator may first insert the second support stud 160" into the threaded hole 236 provided within the frame 116 (or within the rearward frame portion 124 of the frame 116). To attain said insertion, the operator may align the second support stud 160" with the threaded hole 236 and may then push the second support stud 160" into the threaded hole 236 such that the shank portion 224 of the second support stud 160" enters first into the threaded hole 236.

Thereafter, the operator may use a tool (e.g., a wrench or a spanner) (not shown) to grab and engage the grasping portion 228 of the second support stud 160" and in turn engage the second support stud 160" and apply torque so as to rotate and tighten the second support stud 160" into the threaded hole 236. Given that the shank portion 224 may include threads 232 (and the threaded hole 236 may include complementing threads), the second support stud 160" may be threadably engaged into the threaded hole 236. In that manner, the second support stud 160" may be threadably coupled with the frame 116 (or the rearward frame portion 124 of the frame 116).

The operator may then initiate a welding operation to weld the second support stud 160" with the frame 116 (or with the rearward frame portion 124 of the frame 116). In some embodiments, the welding operation may include an application of a weld, W, into the threaded hole 236 such that the threaded hole 236 and the shank portion 224 of the second support stud 160" may be welded and retained together. In so doing, the second support stud 160" may be permanently and irremovably coupled to the frame 116 (or the rearward frame portion 124 of the frame 116). The operator may then bring forth the first support stud 160' and couple the first support stud 160' to the frame 116 (or to the rearward frame portion 124 of the frame 116), in a similar manner as the second support stud 160" is coupled to the frame 116 (or to the rearward frame portion 124 of the frame 116). Once both the first support stud 160' and the second support stud 160" are coupled to the frame 116 (or to the rearward frame portion 124 of the frame 116) in the manner discussed above, both the first support stud 160' and the second support stud 160" may project or extend outwards from the frame 116 (or from the rearward frame portion 124 of the frame 116). Alternatively, the welding operation may be omitted.

As next step, the operator may bring forth the counterweight assembly 152 (e.g., assisted by a crane that may be one and the same as the lifting assembly 248) and may align the primary first through hole 200' and the secondary first through hole 200" correspondingly with the first support stud 160' and the second support stud 160". Once the primary first through hole 200' and the secondary first through hole 200" are aligned with the first support stud 160' and the second support stud 160", the operator and may push the counterweight assembly 152 (e.g., see direction, A, FIG. 7) towards the frame 116 (or towards the rearward frame portion 124 of the frame 116) such that the primary first through hole 200' and the secondary first through hole 200" receive the first support stud 160' and the second support stud 160", respectively. At this point, the chamfered edges (e.g., chamfered edge 208) correspondingly defined by the primary first through hole 200' and the secondary first through hole 200" may help align and guide the insertion of the first support stud 160' and the second support stud 160" respectively into the primary first through hole 200' and the secondary first through hole 200". Thus, the support studs 160 may control a positioning of the counterweight assembly 152 relative to the frame 116 (or to the rearward frame portion 124 of the frame 116) during the assembly process.

In some embodiments, a complimenting chamfered edge (not shown) may be also provided on the head portion 220. Such a complimenting chamfered edge may ease guidance, insertion, and assembly of the support studs 160, respectively into the primary first through hole 200' and the secondary first through hole 200".

Once the primary first through hole 200' and the secondary first through hole 200" respectively receive the first support stud 160' and the second support stud 160", the operator may bring forth the fasteners 216 (e.g., with respective washers) and then insert and drive said fasteners 216 correspondingly into the primary set of second through holes 212' and the secondary set of second through holes 212" and then into corresponding threaded holes (e.g., see threaded hole 218, FIGS. 7 and 8) provided within the frame 116 (or within the rearward frame portion 124 of the frame 116) so as to tighten, couple, and retain the counterweight assembly 152, with the frame 116 (or with the rearward frame portion 124 of the frame 116). If the fasteners 216 and the second through holes 212', 212" are correspondingly threaded, the fasteners 216 can be rotated to engage the second through holes 212', 212" and secure the counterweight assembly 152 to the frame 116 (or to the rearward frame portion 124 of the frame 116).

During a lifting operation or during a lifting of the work machine 100, the lifting assembly 248 (e.g., arrangement of the hook 252 and chain 256, FIG. 2) may be received in to the first eyelet 240 and the second eyelet 244. When or as the work machine 100 may be lifted, the support studs 160 transfer the lifting force (e.g., a majority of the lifting force) during said lifting of the work machine 100 from the counterweight assembly 152 to the frame 116 (or to the rearward frame portion 124 of the frame 116). In that manner, the work machine 100 may be raised or lowered into one or more locations for certain applications, e.g., for being stowed away when not in use, when being shipped to a new location, when being hoisted to be placed in a worksite with limited access such as a cargo ship hold, and/or when being used to move earth from those locations, with ease and convenience.

It may be noted that once the fasteners 216 and the support studs 160 are assembled with the structure 156, the head portions 220 of the support studs 160 may correspondingly register or lie in abutment with the inner surfaces 204 of the primary first through hole 200' and the secondary first through hole 200". Further, the shank portions 224 (or the threads 232) of the support studs 160 may register or lie in abutment with a surface of the frame 116 (or the rearward frame portion 124 of the frame 116) that define the threaded holes (e.g., threaded hole 236) into which the support studs 160 may be inserted. In that manner, the head portion 220 and the shank portion 224 (or the threads 232) may facilitate a transfer of the load or the lifting force, radially, during the lifting operation. Simultaneously, or otherwise, the fasteners 216 may manage any axial loads, preventing a decoupling or a disengagement of the counterweight assembly 152 from the frame 116 (or from the rearward frame portion 124 of the frame 116).

Further, the counterweight assembly 152 also provides accommodation to the guard rail 260 that provides guarding at the rearward end 132 of the work machine 100 to protect the power compartment 144 (including components such as a radiator that may be positioned within the power compartment 144) from damage that may occur from any interference with external elements or objects of the worksite 104. The first housing 168' and the second housing 168" being arranged on the first side wall 164' and the second side wall 164" to position the light units 264 (i.e., the first light unit 276 and the second light unit 280) secures the light units 264 and can meet one or more federally mandated standards or requirements, such as the ISO 12509 requirements, while also allowing said light units 264 to serve one or more of its intended purpose, as has been discussed above—i.e., to illuminate a travel path of the work machine 100, indicate an operational stage associated with the work machine 100, and/or indicate where the work machine 100 may be heading during its travel over and across the worksite 104.

Lift capacity requirements of the work machine 100 (i.e., a requirement associated with the overall weight of the counterweight assembly 152 to counter a load in the implement 136) are also easily achieved and may also be customizable in certain scenarios, e.g., given the provision to add or remove additional plates (e.g., additional plate 284) to the second plate 176 to (e.g., proportionally) increase or decrease the overall weight of the counterweight assembly 152. Furthermore, the counterweight assembly 152 may also be designed and positioned with respect to the work machine 100 so as to meet requirements associated with a turning circle and a departure angle of the work machine 100.

Effectively, the counterweight assembly 152, as discussed above, is an all-inclusive, integrated, and multi-purpose serving structure that requires less footprint or real estate against panels and/or parts (e.g., the rearward frame portion 124 of the frame 116) of the work machine 100. This makes the work machine 100 less complex and less bulky, and one which is relatively easy to use, service, and maintain.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A counterweight assembly for a work machine, the counterweight assembly comprising:
   a structure configured to be coupled to a frame of the work machine, the structure defining one or more through holes, a first side end, and a second side end opposing the first side end;
   one or more support studs configured to be fixedly coupled to the frame and be correspondingly received into the one or more through holes to align and support the structure against the frame;
   a first side wall extending from the first side end and defining a first eyelet;
   a second side wall extending from the second side end and defining a second eyelet, the second side wall being spaced apart from the first side wall to receive a guard rail of the work machine therebetween, wherein one or more of the first eyelet and the second eyelet are configured to receive a lifting assembly for a lifting of the work machine, and the one or more support studs are configured to transfer a lifting force during the lifting of the work machine from the counterweight assembly to the frame.

2. The counterweight assembly of claim 1 further comprising a first housing and a second housing respectively coupled to a first portion and a second portion of the counterweight assembly, the first housing and the second housing configured to receive a first light unit and a second light unit, respectively.

3. The counterweight assembly of claim 1, wherein each support stud of the one or more support studs is configured to be welded to the frame.

4. The counterweight assembly of claim 1, wherein each support stud of the one or more support studs defines a head portion, a shank portion including threads, and a grasping portion configured to be engaged by a tool to tighten and threadably couple the shank portion into a corresponding threaded hole defined by the frame.

5. The counterweight assembly of claim 1, wherein the one or more through holes correspond to one or more first through holes, the structure defining one or more second through holes to correspondingly receive one or more fasteners therethrough to couple the structure to the frame.

6. The counterweight assembly of claim 5, wherein the structure includes a first plate and a second plate, each of the one or more first through holes and the one or more second through holes being formed in the first plate.

7. The counterweight assembly of claim 6, wherein the first plate defines a first surface and a second surface, each first through hole of the one or more first through holes extending from the first surface to the second surface and defining an inner surface and a chamfered edge extending from and diverging from the inner surface to the first surface.

8. The counterweight assembly of claim 7, wherein the first surface is disposed oppositely to the second surface and is configured to be directed towards the frame.

9. The counterweight assembly of claim 6, wherein the second plate is disposed orthogonally with respect to the first plate.

10. The counterweight assembly of claim 6, wherein both the first plate and the second plate are formed from sheet metal.

11. The counterweight assembly of claim 1, wherein one or more of the first side wall and the second side wall extend upright relative to the structure.

12. The counterweight assembly of claim 1 further comprising one or more additional plates configured to be coupled to the structure to increase an overall weight of the counterweight assembly.

13. A work machine, comprising:
a frame;
a counterweight assembly, including:
 a structure coupled to the frame, the structure defining one or more through holes, a first side end, and a second side end opposing the first side end;
 one or more support studs fixedly coupled to the frame and correspondingly received into the one or more through holes to align and support the structure against the frame;
 a first side wall extending from the first side end and defining a first eyelet;
 a second side wall extending from the second side end and defining a second eyelet, the second side wall being spaced apart from the first side wall to receive a guard rail of the work machine therebetween, wherein
  one or more of the first eyelet and the second eyelet are configured to receive a lifting assembly for a lifting of the work machine, and
  the one or more support studs are configured to transfer a lifting force during the lifting of the work machine from the counterweight assembly to the frame.

14. The work machine of claim 13 further comprising a first housing and a second housing respectively coupled to a first portion and a second portion of the counterweight assembly, the first housing and the second housing configured to receive a first light unit and a second light unit, respectively.

15. The work machine of claim 13, wherein each support stud of the one or more support studs is welded to the frame.

16. The work machine of claim 13, wherein each support stud of the one or more support studs defines a head portion, a shank portion including threads, and a grasping portion configured to be engaged by a tool to tighten and threadably couple the shank portion into a corresponding threaded hole defined by the frame.

17. The work machine of claim 13, wherein
the one or more through holes correspond to one or more first through holes, the structure defining one or more second through holes to correspondingly receive one or more fasteners therethrough to couple the structure to the frame, and
the structure includes a first plate and a second plate, each of the one or more first through holes and the one or more second through holes being formed in the first plate.

18. The work machine of claim 17, wherein
the first plate defines a first surface and a second surface, each first through hole of the one or more first through holes extending from the first surface to the second surface and defining an inner surface and a chamfered edge extending from and diverging from the inner surface to the first surface, and
the first surface is disposed oppositely to the second surface and is directed towards the frame.

19. The work machine of claim 17, wherein
the second plate is disposed orthogonally with respect to the first plate, and
both the first plate and the second plate are formed from sheet metal, the work machine further comprising one or more additional plates configured to be coupled to the second plate to increase an overall weight of the counterweight assembly.

20. The work machine of claim 13, wherein one or more of the first side wall and the second side wall extend upright relative to the structure.

* * * * *